June 2, 1931. T. N. GARSON 1,808,217
TRACTOR FRAME
Filed June 21, 1928
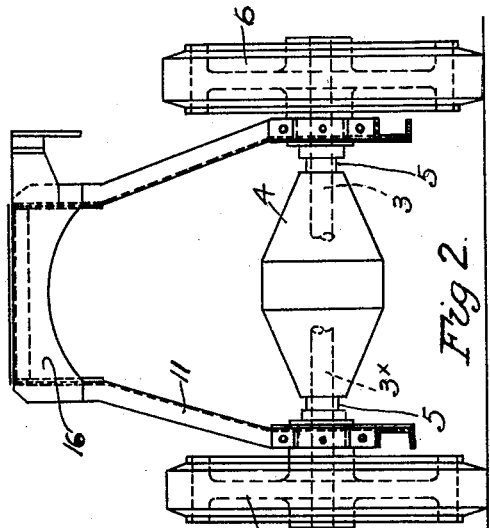
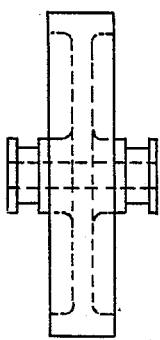
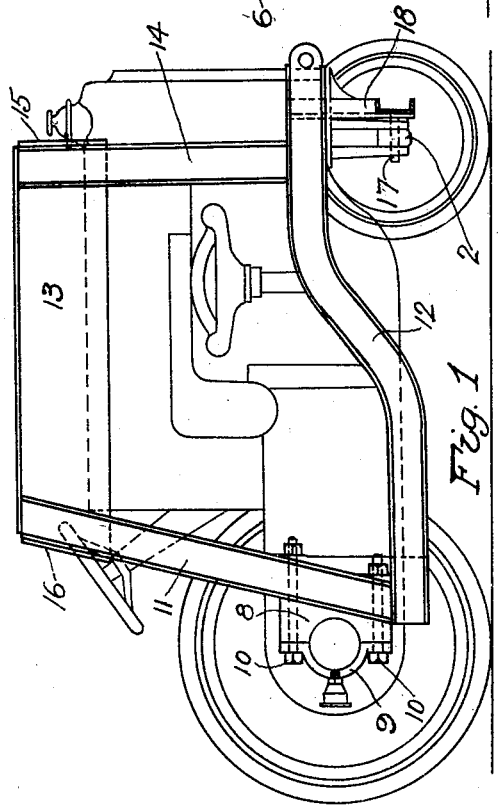
Thowald N. Garson
INVENTOR
BY
ATTORNEY Patented June 2, 1931

1,808,217

UNITED STATES PATENT OFFICE

THORVALD N. GARSON, OF NEW BRIGHTON, NEW YORK

TRACTOR FRAME

Application filed June 21, 1928. Serial No. 287,066.

The object of the present invention is to provide a tractor frame of such a construction that the chassis may, as customary, be carried by the rear axle housing and a supplemental frame may be supported directly upon the rear wheels and the front axle so as to throw the load independently of the rear axle housing and the chassis, so that the supplemental frame may carry very heavy loads, as for example when the frame is used as the support for a hoisting device.

The invention will be described with reference to the accompanying drawings, in which—

Figure 1 is a side elevation of an embodiment of the invention, and

Figure 2 is a rear elevation of the same;

Figure 3 is a top plan view of a wheel with grooved hub, and

Figure 4 is a similar view showing the wheel provided with a grooved hub at each side.

In the drawings, I have illustrated diagrammatically a tractor having a front axle 2 and a rear axle 3, 3× shown in dotted lines. The rear axle is mounted in an axle and differential housing 4, having spaced mountings 5 for supporting the tractor at its rear. The axle 3, 3× is connected to wheels 6 in the customary manner for driving the latter.

The wheels 6 are of special construction being formed, as shown in Figures 1, 2 and 3, with inwardly projecting special hubs 7, which are grooved at 7×. The groove receives a block 8 formed with a segmental channel, and the groove also receives a strap 9 which is bolted to the block by means of the bolts 10. The block in each case is bolted to the rear upwardly projecting frame member 11, of the supplemental frame.

The said frame member 11, in each case, is connected at its base with the lower side frame member 12 and at its top with an upper side frame member 13. Frame members 13 are connected to members 12 at the front by upwardly extending front member 14. The said supplemental frame is further reinforced by the front plate 15 and rear plate 16, and by any other connections which may be required in order to further stability and strength to the supplemental frame structure. The said supplemental frame may be pivotally hung upon the front axle by a pin 17 connected to a depending frame member 18 of any suitable construction, member 18 being connected to the supplemental frame.

When the wheel is formed with grooved hubs at each side thereof, a connection for the outer hub will be projected from the supplemental frame to the exterior of the wheel, straddling the same, as will be understood without need of detailed showing or description. Ordinarily, however, the single hub construction will suffice.

By means of the improvements, the strains of loads carried by the supplemental frame are not thrown upon the tractor chassis or axle housing, but are passed directly to the rear wheels and to the heavy front axle, thus enabling greater loading capacity of a crane or other hoisting device than ordinarily.

Having described my invention what I claim and desire to secure by Letters Patent is as follows:—

In a tractor comprising a frame and front and rear axles secured thereto, of front and rear wheels connected to said axles, and means including the rear axle for driving the rear wheels, of lateral projecting annular hub extensions for the rear wheels, a supplemental tractor frame comprising front and rear upwardly projecting frame members and interconnecting members therefor, means connecting the rear frame members to the hub extensions of the rear wheels whereby said wheels serve as the entire support for the rear of the supplemental frame, and means connecting the supplemental frame at its front to the front axle.

In testimony whereof, I have signed my name to this specification.

THORVALD N. GARSON.